United States Patent [19]

Dallhammer et al.

[11] Patent Number: 4,808,200
[45] Date of Patent: Feb. 28, 1989

[54] ELECTROSTATIC PRECIPITATOR POWER SUPPLY

[75] Inventors: Richard Dallhammer, Nürnberg; Franz Neulinger, Erzhausen; Walter Schmidt, Uttenreuth; Helmut Schummer, Heusenstamm, all of Fed. Rep. of Germany

[73] Assignee: Siemens Aktiengesellschaft, Berlin and Munich, Fed. Rep. of Germany

[21] Appl. No.: 119,585

[22] Filed: Nov. 12, 1987

[30] Foreign Application Priority Data

Nov. 24, 1986 [DE] Fed. Rep. of Germany ....... 3640092

[51] Int. Cl.⁴ .............................................. B03C 3/66
[52] U.S. Cl. ...................................... 55/105; 55/139; 307/2; 323/903; 361/235
[58] Field of Search ...................... 55/105, 139; 307/2, 307/73; 323/903; 361/235; 363/16, 28

[56] References Cited

U.S. PATENT DOCUMENTS

| | | | |
|---|---|---|---|
| 3,443,361 | 5/1969 | Drenning | 323/903 |
| 3,622,839 | 11/1971 | Abrams | 361/235 |
| 3,873,282 | 3/1975 | Finch | 323/903 |
| 3,877,896 | 4/1975 | Muskovac | 55/139 |
| 3,984,215 | 10/1976 | Zucker | 55/105 |
| 4,233,039 | 11/1980 | Schmidt | 307/2 |
| 4,390,831 | 6/1983 | Byrd et al. | 323/903 |
| 4,413,225 | 11/1983 | Donig et al. | 323/903 |
| 4,503,477 | 3/1985 | Henriksen et al. | 361/235 |
| 4,558,404 | 12/1985 | James | 323/903 |
| 4,592,763 | 6/1986 | Dietz et al. | 323/903 |

FOREIGN PATENT DOCUMENTS

3027172 A1 2/1982 Fed. Rep. of Germany .
3246057 A1 6/1984 Fed. Rep. of Germany .

*Primary Examiner*—Patrick R. Salce
*Assistant Examiner*—Jeffrey Sterrett
*Attorney, Agent, or Firm*—Kenyon & Kenyon

[57] ABSTRACT

An electrostatic precipitator is supplied with a d-c voltage of variable level upon which is superimposed a series of voltage pulses. For each voltage pulse, the difference between a positive current-time area and a negative current-time area beneath a current-voltage curve is determined and maximized by changing the pulse amplitude, pulse width, pulse repetition frequency and/or the rate of pulse rise. In addition, the d-c voltage is controlled to have a value at a point of maximum slope of the function of precipitator current with respect to the magnitude of the d-c voltage.

19 Claims, 2 Drawing Sheets

ELECTROSTATIC PRECIPITATOR POWER SUPPLY

BACKGROUND OF THE INVENTION

This invention relates to a method and apparatus for supplying electrical energy to an electrostatic precipitator. More particularly, this invention relates to a method and apparatus for supplying to an electrostatic precipitator a d-c voltage of variable level and superimposed voltage pulses.

To increase the degree of dust separation achieved by electrostatic precipitators, the electrodes of the precipitators have been subjected to d-c voltages at levels just under the breakdown limits of the precipitator, as well as to high-voltage pulses of variable pulse amplitude, pulse width, pulse repetition frequency and/or pulse rise rate. The high-voltage pulses serve to generate additional charge carriers in the electrostatic precipitators without provoking the formation of arcs. Generally, the high-voltage pulses are generated by exciting the primary winding of a high-voltage transformer having a secondary winding connected to an electrode of an electrostatic precipitator.

Such arrangements for electrically energizing electrostatic precipitators are known from West German Offenlegungsschrift No. 30 27 172 and West German Offenlegungsschrift No. 32 46 057. A method disclosed in the former patent document is aimed at optimizing the separating action with respect to the energy expenditure.

An object of the present invention is to provide a method and apparatus for supplying electrical energy to an electrostatic precipitator which maximizes the dust separation effectuated by the precipitator.

SUMMARY OF THE INVENTION

A method for electrically energizing an electrostatic precipitator comprises, in accordance with the present invention, the steps of generating a d-c voltage of amplitude which is variable in accordance with precipitator breakdown thresholds, transmitting the d-c voltage to the electrostatic precipitator, and generating a series of voltage pulses characterized by a plurality of parameters including d-c potential level, pulse amplitude, pulse width, pulse repetition frequency and rate of voltage rise, wherein at least one of those parameters is variable. The voltage pulses are transmitted to the electrostatic precipitator over the primary winding and the secondary winding of a high-voltage transformer, whereby the voltage pulses are superimposed on the d-c voltage. Pursuant to the present invention, the current of least one of the voltage pulses is sensed and an electrical signal indicative of that sensed or measured current is generated. A difference between a positive area under a current-time curve and a negative area under such curve is automatically determined from the electrical signal, and at least one of the parameters of the voltage pulses is automatically varied in response to the detected difference in current-time area to increase the value of that difference.

A main advantage of the present invention is that the degree of separation effectuated by an electrostatic precipitator can be maximized effectively by application of a simple criterion. In addition, if the current of the measured voltage pulse is sensed on a primary winding side of the high voltage transformer, devices for effectuating the difference determination need not be high-voltage proof.

In accordance with another feature of the present invention, the current through the electrostatic precipitator is measured and a region of maximum slope of a functional relationship between the measured current and the d-c voltage is automatically determined to establish an effective maximum level of the d-c voltage. The d-c voltage is maintained at the computed maximum level at least until another measurement of current through the electrostatic precipitator is made at a subsequent time. These steps ensure that the d-c voltage of the electrostatic precipitator is always controlled to remain as close as possible to the breakdown limit, in dependence on constantly varying operating conditions.

An apparatus for electrically energizing an electrostatic precipitator comprises, in accordance with the present invention, a first voltage generator for producing a d-c voltage of amplitude variable in accordance with precipitator breakdown thresholds, and a second voltage generator for producing a series of voltage pulses characterized by a plurality of parameters including d-c potential level, pulse amplitude, pulse width, pulse repetition frequency and rate of voltage rise, wherein at least one of the parameters is variable. Both of the voltage generators are connected to the electrostatic precipitator whereby the voltage pulses produced by the second voltage generator are transmitted to the electrostatic precipitator and superimposed on the d-c voltage produced by the first voltage generator. A current detector is operatively connected to the second voltage generator for sensing a current of at least one of the voltage pulses and for generating an electrical signal indicative of the sensed current. A calculation device, such as an integrator, is operatively connected to the current detector for automatically determining from the electrical output signal thereof a difference between a positive area under a current-time curve and a negative area under such curve. A control unit is operatively coupled to the calculation device for automatically varying at least one of the voltage pulse parameters in response to the calculated difference in current-time area to increase the value of that difference.

The second voltage generator preferably includes a thyristor and a diode connected antiparallel to one another and to the primary winding of the transformer. The secondary winding of the transformer is connected via a coupling capacitor to an electrode of the electrostatic precipitator, the second voltage generator further including a firing device operatively tied to the thyristor for triggering the thyristor periodically to generate the voltage pulses.

Pursuant to a particular feature of the present invention, the control unit includes an inductor operatively connected to the primary winding of the high-voltage transformer. The inductor, placed in a tuned circuit formed by the electrostatic precipitator in conjunction with the second voltage generator, provides the possibility of adjusting the pulse width and rate of pulse rise of the pulses produced by the second voltage generator.

DETAILED DESCRIPTION

Figure 1:
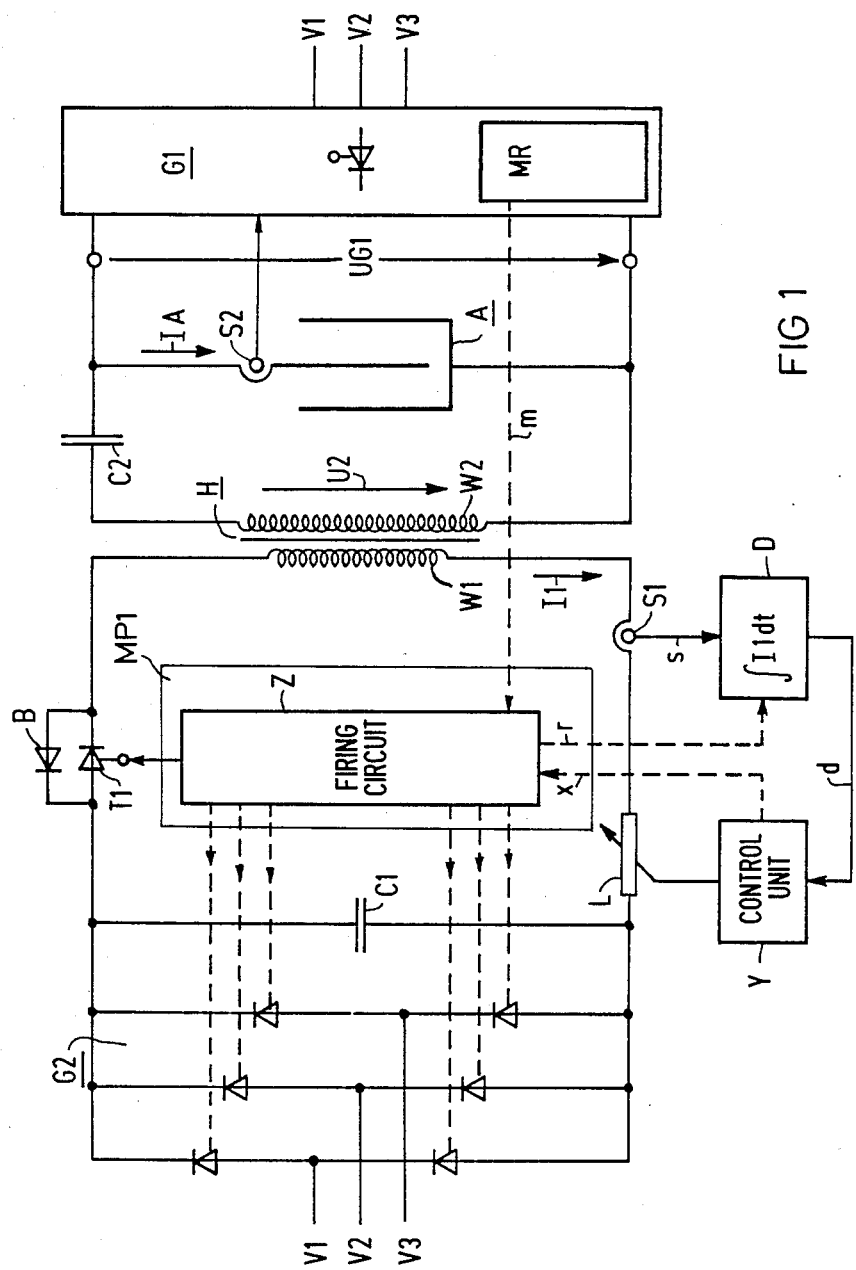
FIG. 1 is partially a circuit diagram and partially a block diagram of an apparatus for supplying electrical energy to an electrostatic precipitator, in accordance with the present invention.

As illustrated in FIG. 1, an apparatus for supplying electrical energy to an electrostatic separator or precipitator A is powered with energy from a three-phase network with voltage phases V1, V2 and V3. A first d-c voltage source in the form of a rectifier device G1 generates a d-c voltage UG1 of a magnitude which is variable in dependence on precipitator breakdown thresholds. The rectifier device G1 is connected to electrostatic precipitator A for supplying d-c voltage UG1 thereto.

A second d-c voltage source in the form of a rectifier set G2 converts the three-phase voltages V1, V2 and V3 into a direct current in conjunction with a storage capacitor C1 and under the control of a firing circuit Z. Firing circuit Z is also connected at an output to a triggering input of a thyristor T1 connected antiparallel to a diode B and in series with rectifier set G2 and a primary winding W1 of a high voltage transformer H. Upon triggering by firing circuit Z, thyristor T1 allows current to flow from storage capacitor C1 through primary winding W1, thereby triggering or energizing a tuned circuit formed by electrostatic precipitator A in conjunction with a pulse voltage source formed by rectifier set G2, thyristor T1 and diode B.

High-voltage transformer H has a secondary winding W2 connected to an electrode of electrostatic separator A via a coupling capacitor C2. Upon the firing of thyristor T1 a voltage pulse U2 is induced in secondary winding W2 and transmitted to precipitator A via capacitor C2.

Owing to a periodic firing of thyristor T1 by circuit Z, a series of high-voltage pulses are transmitted to precipitator A and superimposed upon the d-c voltage from rectifier device G1. A representative voltage pulse U2 is plotted on the graph of FIG. 2. Upon a firing of thyristor T1 at time t1, the voltage level of pulse U2 increases to a maximum at time t2 and then decreases back to zero at time t3, while current I1 flowing through primary winding W1 initially has positive values between times t1 and t2 and subsequently negative values between times t2 and t3. The negative values of current I1 arise from the provision of diode B across thyristor T1. Thyristor T1 is switched into a nonconducting state at time t2 and between times t2 and t3 diode B allows energy to flow back to storage capacitor C1. Clearly, it is not possible to convert the entire energy of the voltage pulse into ionization of dust particles, some of the energy flowing back to storage capacitor C1 to partially recharge the capacitor.

Figure 2:
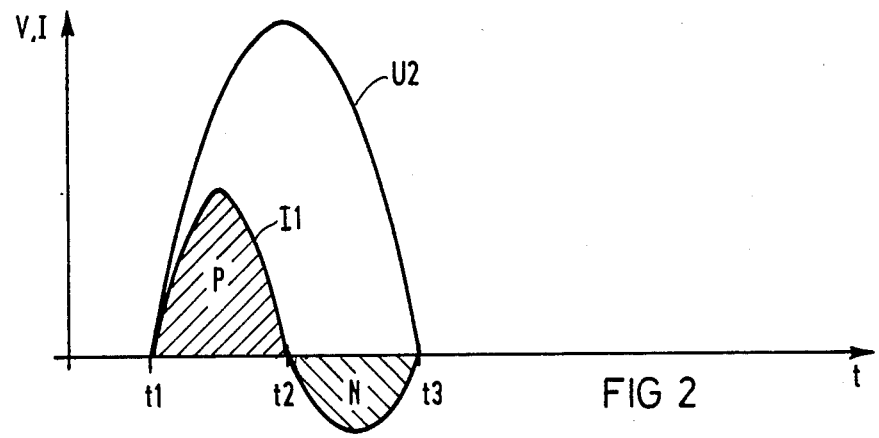
FIG. 2 is a graph, as functions of time, of a voltage and current of a voltage pulse produced by a voltage pulse generator in the apparatus of FIG. 1.

The positive area P under the current-time curve of FIG. 2, between times t1 and t2, corresponds to energy which is initially transmitted to electrostatic precipitator A from the pulse voltage source. The negative current-time area N between times t2 and t3 represents a portion of the energy transmitted back to the pulse voltage source. The net energy represented by the difference (P−N) between current-time areas P and N corresponds to the increase, effected by voltage pulse U2, in the ionizing corona current in electrostatic precipitator A. The difference (P−N) is accordingly a measure of the efficiency of generating charge-carrying dust particles which are transported to the electrodes of electrostatic precipitator A by the d-c field generated by rectifier device D1.

In accordance with the present invention, the degree of dust separation achieved by precipitator A is increased by measuring the difference (P−N) between current-time areas P and N of current pulse I1 on the primary side of high-voltage transformer H. Alternatively, the current pulse in secondary winding W2 of transformer H could be measured and evaluated. However, in that case, increased expense would result owing to the necessity of protecting the measuring device from the higher voltage on the secondary side of the transformer.

As shown in FIG. 1, a current sensor S is provided for measuring current pulse I1 in the primary transformer winding W1 and for generating an electrical signal proportional to the instantaneous current. The electrical signal is transmitted to an integrator D, which is always reset to an initial value of zero upon a firing of thyristor T1. The resetting of integrator D is executed by firing circuit Z via a reset line r.

Owing to the integration of current pulse I1 between times t1 and t3 integrator D generates an output signal d representing the difference (P−N) between current-time areas P and N. Difference signal d is fed to an evaluation nor control unit Y connected at an output to an inductor L having a variable inductance. In response to difference signal d, evaluation unit Y adjusts the inductance of inductor L in the course of a series of voltage pulses in such a manner as to maximize the difference (P−N) between current-time areas P and N. Inductor L is disposed in series with rectifier set G2, the antiparallel circuit of thyristor T1 and diode B, and primary transformer winding W1, whereby a change in the value of the inductor's inductance changes the pulse width and rate of rise of the voltage pulses. In addition, evaluation unit Y is connected via a lead x to firing circuit Z for causing that circuit to modify the frequency of firing of the rectifiers of rectifier set G2, whereby pulse amplitude of the voltage pulses may be adjusted. In addition, in response to signals received from evaluation or control unit Y via lead x, firing circuit Z may vary the repetition frequency of the voltage pulses by varying the rate at which thyristor D1 is fired.

The extent of dust separation effectuated by electrostatic precipitator A depends not only on the quality of the voltage pulses superimposed on the d-c voltage UG1 but also on the level of that d-c voltage. Voltage UG1 should, on the one hand, be as high as possible so as to enhance the process of generating and transporting charge carriers in the interior of electrostatic separator A. On the other hand, the electric field intensity in precipitator A should remain below the precipitator breakdown limit. The breakdown limit is difficult to measure and varies with the operating conditions of the precipitator. The most common method for controlling d-c voltage UG1 is to increase the magnitude of the voltage systematically until a breakdown occurs and to repeat the process cyclically and continuously. In the utilization of that method, the unfavorable effects of the regular breakdowns on energy consumption, electrode life, the life of the electronic circuitry and the separating effectiveness are tolerated.

Figure 3:
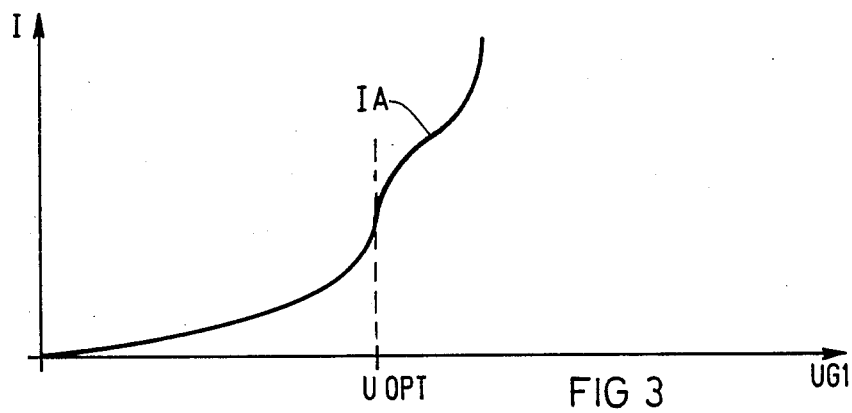
FIG. 3 is a graph of the current through the electrostatic precipitator of FIG. 1, as a function of d-c voltage applied to the precipitator's electrodes.

The frequency of precipitator breakdown can be reduced considerably by providing a measuring and control unit MR (FIG. 1) which automatically measures at periodic intervals the actual dependence of separator current IA on the magnitude of d-c voltage UG1 and adjusts the d-c voltage UG1 to have a magnitude in a region UOPT of maximum slope of the current-voltage curve (see FIG. 3). Adjusting d-c voltage UG1 to assume a value in optimal region UOPT assures that electrostatic precipitator A is operated in the vincinity of the breakdown limit but nevertheless below that limit point.

Inasmuch as the function of precipitator current IA with respect to the magnitude of d-c voltage UG1 can vary continuously in response to varying operating conditions, such as varying dust quality and dust loading, measurements of current and voltage are periodically made and the curve reevaluated. A new measurement can be triggered by a timing circuit (not illustrated). a dust monitor (not illustrated) and/or a breakdown detection unit (not illustrated). Measuring and control unit MR can further include a control line m extending to firing circuit Z for limiting the pulse amplitude and/or the pulse frequency of the voltage pulses in accordance with the actual magnitude of d-c voltage UG1. As depicted in FIG. 1, a sensor S2 is provided for measuring current IA and transmitting it to measuring and control circuit MR.

Firing circuit Z, evaluation or control unit Y and/or measuring and control unit MR can advantageously in many practical applications constitute respective process computers, especially digital microprocessors such as MP1 of FIG. 1. Alternatively, the functions of units Z, Y and MR may be performed by a single computer (not illustrated).

Figure 4:
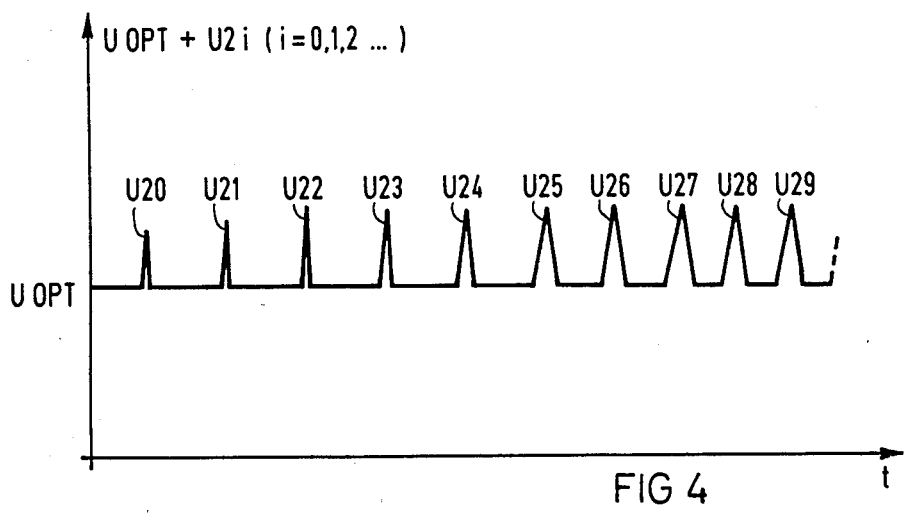
FIG. 4 is a graph showing high-voltage pulses superimposed on a d-c voltage, with pulse parameters varying in accordance with the present invention.

In a typical procedure for supplying electrostatic precipitator A with an overall voltage serving to maximize the degree of dust separation effectuated in precipitator Z, the optimum level or magnitude of d-c voltage UG1 (selected as described hereinabove) is superimposed with voltage pulses U2i (i=0, 1, 2, ...) which are optimized as follows (see FIG. 4). After an initial pulse U20, the pulse amplitude of immediately subsequent voltage pulses U21, U22 is increased just enough that, although the corona current conducted is increased, no precipitator breakdown is provoked due to the smallness of the voltage pulses. In the course of subsequent voltage pulses U23 to U25, the pulse width is increased by adjustment of inductor L to an inductance which results in the largest difference (P−N) between the positive and negative current-time areas P and N of the current pulse I1. The pulse width of the voltage pulses is generally no more than 200 mc and is exaggerated in FIG. 4 for purposes of clarity. Finally, the pulse repetition frequency is increased during pulses U25 to U29 to a maximum rate possible without triggering precipitator breakdown. The upper limit of the pulse repetition frequency is approximately several hundred Hertz.

The adjustment process described hereinabove is triggered cyclically anew, upon the determination of the optimum level (UOPT) of d-c voltage UG1 (FIG. 3), whether that determination occurs at the end of a given time interval or after the detection of a substantial change in load, type of dust, temperature, etc. Accordingly, the effectiveness of dust separation in electrostatic precipitator A is maximized while the frequency of precipitator breakdown is minimized.

What is claimed is:

1. A method for electrically energizing an electrostatic precipitator, comprising the steps of:

generating a d-c voltage of amplitude variable in accordance with precipitator breakdown thresholds;

transmitting said d-c voltage to said electrostatic precipitator;

generating a series of voltage pulses characterized by a plurality of parameters including d-c potential level, pulse amplitude, pulse width, pulse repetition frequency and rate of voltage rise, at least one of said parameters being variable;

transmitting said voltage pulses to said electrostatic precipitator over a primary winding and a second winding of a high-voltage transformer, thereby superimposing said voltage pulses on said d-c voltage;

sensing a current of at least of said voltage pulses;

generating an electrical signal indicative of said current;

automatically determining from said electrical signal a difference between a positive area under a current-time curve for said sensed current and a negative area under such current-time curve; and automatically varying at least one of said plurality of parameters in response to said difference to increase the value of said difference.

2. The method set forth in claim 1 therein the current of said one of said voltage pulses is sensed on a primary winding side of said transformer.

3. The method set forth in claim 2, further comprising the steps of measuring current through said electrostatic precipitator, automatically determining a region of maximum slope of a functional relationship between the measured current and said d-c voltage, thereby establishing an effective maximum level of said d-c voltage, and maintaining said d-c voltage at said maximum level at least until another measurement of current through said electrostatic precipitator at a subsequent time.

4. The method set forth in claim 3 wherein said subsequent time is determined in accordance with operating conditions of said electrostatic precipitator.

5. The method set forth in claim 3 wherein said subsequent time is predetermined.

6. The method set forth in claim 5, further comprising the step of limiting pulse amplitude and pulse repetition frequency to values below thresholds at which precipitator breakdown occurs, said thresholds being established in accordance with said d-c voltage.

7. The method set forth in claim 1, further comprising the steps of measuring current through said electrostatic precipitator, automatically determining a region of maximum slope of a functional relationship between the measured current and said d-c voltage, thereby establishing an effective maximum level of said d-c voltage, and maintaining said d-c voltage at said maximum level at least until another measurement of current through said electrostatic precipitator at a subsequent time.

8. An apparatus for electrically energizing an electrostatic precipitator, comprising:

first voltage generating means for generating a d-c voltage of amplitude variable in accordance with precipitator breakdown thresholds, said first voltage generating means being operatively connected to said electrostatic precipitator, whereby said d-c voltage is transmitted to said electrostatic precipitator;

second voltage generating means for generating a series of voltage pulses characterized by a plurality of parameters including d-c potential level, pulse amplitude, pulse width, pulse repetition frequency and rate of voltage rise, at least one of said parameters being variable, said second voltage generating means being operatively connected to said electrostatic precipitator over a primary winding and a second winding of a high-voltage transformer, whereby said voltage pulses are transmitted to said electrostatic precipitator and superimposed on said d-c voltage;

current detector means operatively connected to said second voltage generating means for sensing a current of at least one of said voltage pulses and for generating an electrical signal indicative of said current;

calculation means operatively connected to said current detector means for automatically determining from said electrical signal a difference between a positive area under a current-time curve for said detected current and a negative area under such current-time curve; and control means operatively coupled to said calculation means automatically varying at least one of said plurality of parameters in response to said difference to increase the value of said difference.

9. The apparatus set forth in claim 8 wherein said second voltage generating means includes a thyristor and a diode connected antiparallel to one another and to said primary winding of said transformer, said secondary winding of said transformer being connected via a coupling capacitor to an electrode of said electrostatic precipitator, said second voltage generating means further including firing means operatively tied to said thyristor for firing said thyristor periodically to generate said voltage pulses.

10. The apparatus set forth in claim 9 wherein said calculation means comprises an integrator for integrating said electrical signal to produce said difference in the form of a difference signal.

11. The apparatus set forth in claim 10 wherein said current detector means comprises a current sensor connected to said primary winding of said transformer.

12. The apparatus set forth in claim 11 wherein said control means includes an inductor operatively connected to said primary winding of aid transformer.

13. The apparatus set forth in claim 12 wherein said firing means and said control means are formed in part by at least one digital computer.

14. The apparatus set forth in claim 13, further comprising additional current detector means for measuring current through said electrostatic precipitator, additional calculation means for automatically determining a region of maximum slope of a functional relationship between the measured current and said d-c voltage, thereby establishing an effective maximum level of said d-c voltage, said first voltage generating means maintaining said d-c voltage at said maximum level at least until another measurement of current through said electrostatic precipitator at a subsequent time.

15. The apparatus set forth in claim 14 wherein said additional calculation means is formed in part by a digital computer.

16. The apparatus set forth in claim 8 wherein said calculation means comprises an integrator for integrating said electrical signal to produce said difference in the form of a difference signal.

17. The apparatus set forth in claim 8 wherein said current detector means comprises a current sensor connected to said primary winding of said transformer.

18. The apparatus set forth in claim 8 wherein said control means includes an inductor operatively connected to said primary winding of said transformer.

19. The apparatus set forth in claim 8, further comprising additional current detector means for measuring current through said electrostatic precipitator, additional calculation means for automatically determining a region of maximum slop of a functional relationship between the measured current and said d-c voltage, thereby establishing an effective maximum level of said d-c voltage, said first voltage generating means maintaining said d-c voltage at said maximum level at least until another measurement of current through said electrostatic precipitator at a subsequent time.

* * * * *